(12) United States Patent
Sawchuk

(10) Patent No.: US 9,625,293 B2
(45) Date of Patent: Apr. 18, 2017

(54) FLOW CONDITIONER HAVING INTEGRAL PRESSURE TAP

(71) Applicant: Daniel Sawchuk, Chestermere (CA)

(72) Inventor: Daniel Sawchuk, Chestermere (CA)

( * ) Notice: Subject to any disclaimer, the term of this patent is extended or adjusted under 35 U.S.C. 154(b) by 0 days.

(21) Appl. No.: 15/151,565

(22) Filed: May 11, 2016

(65) Prior Publication Data

US 2016/0334249 A1    Nov. 17, 2016

Related U.S. Application Data

(60) Provisional application No. 62/161,358, filed on May 14, 2015.

(51) Int. Cl.
| G01F 1/37 | (2006.01) |
| G01F 1/40 | (2006.01) |
| F15D 1/02 | (2006.01) |
| G01F 15/00 | (2006.01) |

(52) U.S. Cl.
CPC .............. *G01F 1/40* (2013.01); *F15D 1/025* (2013.01); *G01F 15/00* (2013.01)

(58) Field of Classification Search
CPC ..... G01F 1/37; G01F 1/44; G01F 1/66; G01F 1/74
USPC ............... 73/861.52, 861.28, 861.04, 861.63
See application file for complete search history.

(56) References Cited

U.S. PATENT DOCUMENTS

| 3,545,492 A | 12/1970 | Scheid |
| 3,838,598 A | 10/1974 | Tompkins |
| 4,715,395 A | 12/1987 | Mainelli et al. |
| 5,327,941 A | 7/1994 | Bitsakis et al. |
| 5,341,848 A | 8/1994 | Laws |
| 5,400,828 A | 3/1995 | Ziu et al. |
| 5,495,872 A | 3/1996 | Gallagher et al. |
| 5,529,093 A | 6/1996 | Gallagher et al. |
| 5,606,297 A | 2/1997 | Phillips |
| 5,762,107 A | 6/1998 | Laws |
| 5,959,216 A | 9/1999 | Hocquet et al. |
| 6,029,912 A | 2/2000 | Woolley |
| 6,145,544 A | 11/2000 | Dutertre et al. |
| 6,494,105 B1 | 12/2002 | Gallagher |
| 6,612,187 B1 * | 9/2003 | Lund ........................ G01F 1/36 73/861.04 |
| 6,647,806 B1 * | 11/2003 | Estrada .................. G01F 15/00 73/861.28 |
| 6,651,514 B2 | 11/2003 | Zanker |

(Continued)

FOREIGN PATENT DOCUMENTS

| CA | 2171828 | 3/1995 |
| CA | 2228928 | 8/1995 |

(Continued)

OTHER PUBLICATIONS

English Abstract of JPS55159831 Dec. 12, 1980.*

(Continued)

*Primary Examiner* — Jewel V Thompson
(74) *Attorney, Agent, or Firm* — Cahn & Samuels, LLP

(57) ABSTRACT

A flow conditioner includes a plate having a hole pattern and a flange surrounding the plate; and at least one pressure tap that is integral with the flow conditioner. The at least one pressure tap is on at least one of a first face of the flow conditioner, a second face of the flow conditioner, within a hole, or any combination thereof.

15 Claims, 3 Drawing Sheets

(56) References Cited

U.S. PATENT DOCUMENTS

| | | |
|---|---|---|
| 6,807,986 B2 | 10/2004 | Boger |
| 6,851,322 B2 | 2/2005 | Gallagher |
| 7,073,534 B2 | 7/2006 | Sawchuk et al. |
| 7,089,963 B2 | 8/2006 | Meheen |
| 7,284,450 B2 * | 10/2007 | Orleskie .................. G01F 1/34 73/861.52 |
| 7,464,611 B2 | 12/2008 | Matter et al. |
| 7,845,688 B2 | 12/2010 | Gallagher et al. |
| 8,132,961 B1 | 3/2012 | England et al. |
| D697,581 S | 1/2014 | Sawchuk et al. |
| D701,939 S | 4/2014 | Sawchuk et al. |
| 8,763,644 B2 | 7/2014 | Tsai et al. |
| D721,417 S | 1/2015 | Sawchuk et al. |
| 2004/0055816 A1 | 3/2004 | Gallagher et al. |
| 2005/0092101 A1 * | 5/2005 | Bengtson ............. G01F 1/3209 73/861.22 |
| 2005/0178455 A1 | 8/2005 | Cancade et al. |
| 2005/0205147 A1 | 9/2005 | Sawchuk et al. |
| 2006/0096650 A1 | 5/2006 | Sawchuk et al. |
| 2008/0037366 A1 | 2/2008 | Smith |
| 2008/0246277 A1 | 10/2008 | Gallagher et al. |
| 2009/0277974 A1 | 11/2009 | Citrawireja et al. |
| 2010/0024910 A1 | 2/2010 | Nakamori et al. |
| 2011/0076628 A1 | 3/2011 | Miura et al. |
| 2011/0174407 A1 | 7/2011 | Lundberg et al. |
| 2011/0174408 A1 | 7/2011 | Lundberg et al. |
| 2012/0247223 A1 | 10/2012 | Sawchuk et al. |
| 2014/0110094 A1 | 4/2014 | Pagan Duran |
| 2014/0196535 A1 | 7/2014 | Sawchuk et al. |
| 2015/0083262 A1 | 3/2015 | Van Buskirk |
| 2016/0061372 A1 | 3/2016 | Sawchuk et al. |

FOREIGN PATENT DOCUMENTS

| | | |
|---|---|---|
| CA | 2787659 | 7/2011 |
| FR | 2233914 A5 | 1/1975 |
| GB | 1469648 | 4/1977 |
| JP | 55159831 S | 12/1980 |
| WO | 2014040191 A1 | 3/2014 |
| WO | 2014110673 A1 | 7/2014 |
| WO | 2014186883 A1 | 11/2014 |

OTHER PUBLICATIONS

English Abstact of FR 2233914, Jan. 10, 1975.
Marchine translation of FR 2233914, Jan. 10, 1975.
English Abstract of JPS55159831.

* cited by examiner

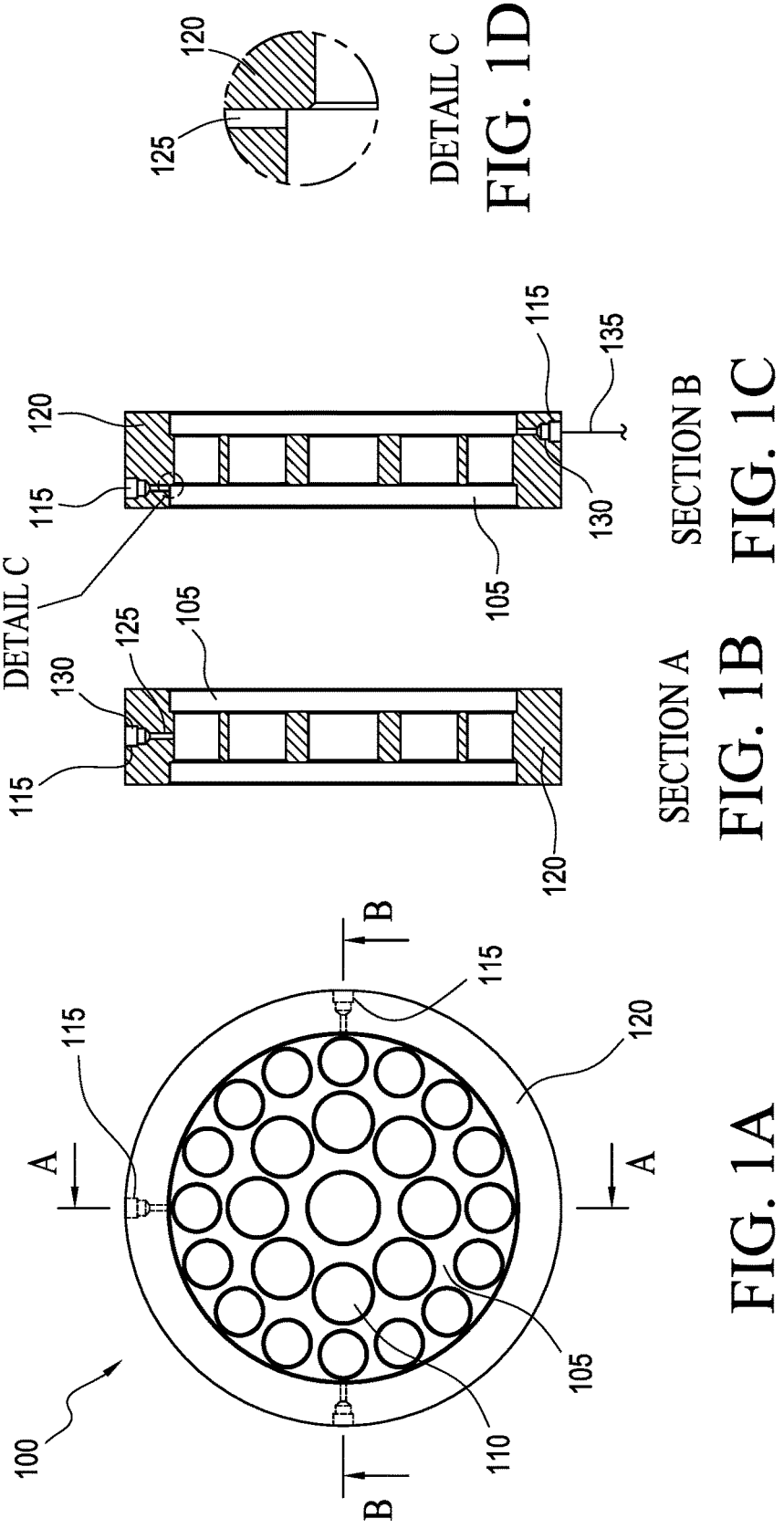

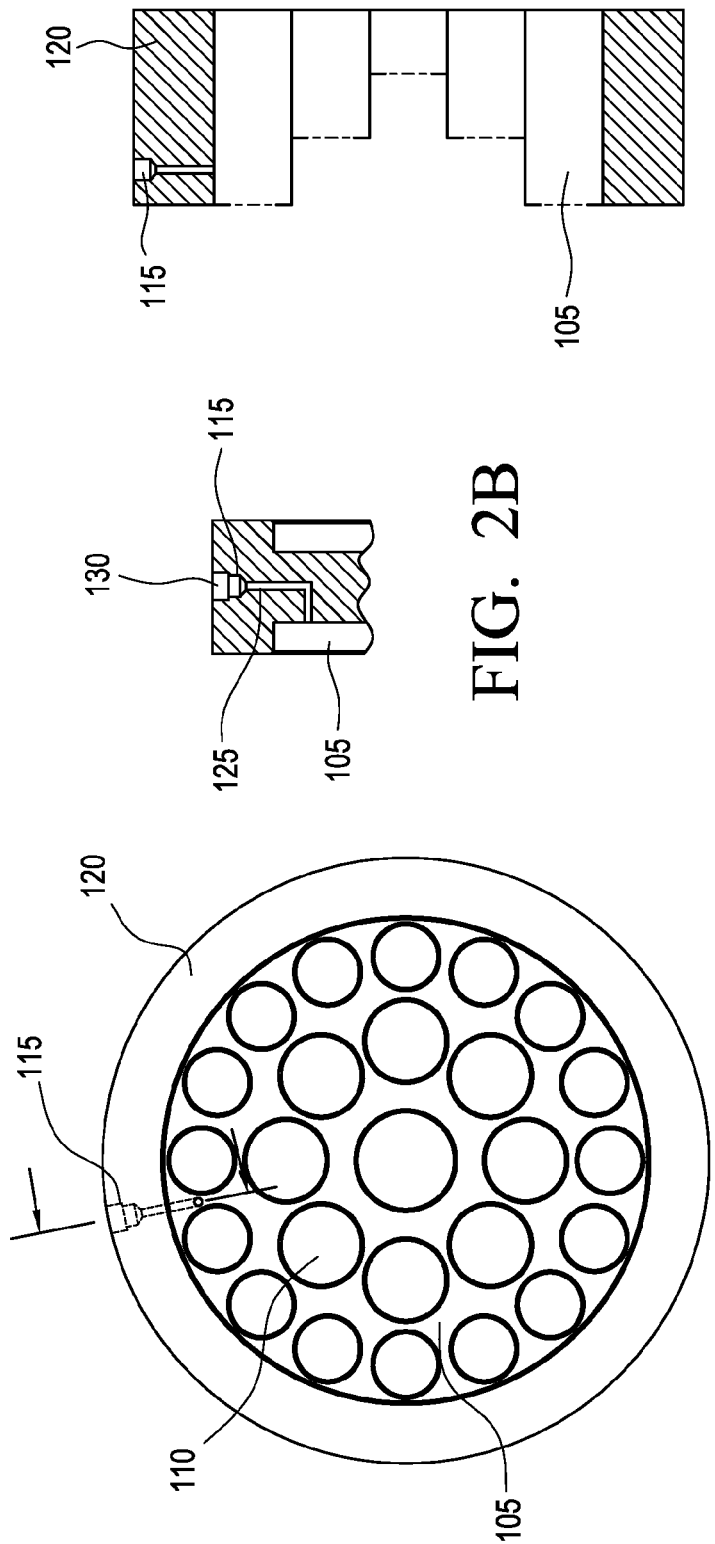

FLOW CONDITIONER HAVING INTEGRAL PRESSURE TAP

This application claims priority to U.S. Provisional Application 62/161,358, filed in the U.S. Patent and Trademark Office on 14 May 2015, the entirety of which is herein incorporated by reference.

TECHNICAL FIELD

The present invention relates to a flow conditioner used in oil, gas, and water pipelines. More particularly, the present invention relates to a flow conditioner comprising at least one integral pressure tap and to a method for performing pressure drop measurements across a flow conditioner.

BACKGROUND OF THE INVENTION

Pipelines are used to transport fluids in various industries, including chemical, oil and gas, and manufacturing. These industries use processes that require fluid flow rates to be accurately measured. Such measurements are performed at locations known as meter stations using a variety of different meter types. These meters function in different ways. The meters can use differential pressure of the fluid across an obstruction, ultrasonic signal travel times, turbine blade rotational speed, Coriolis forces, or even electrical and magnetic fields being generated due to bulk fluid movement. Almost all of these measurement methods require use of a fluid velocity distribution, known as a velocity flow profile.

To achieve the most accurate measurements, the flow profile of the fluid entering a metering device must be stable, non-rotating, and symmetric. This type of velocity distribution is known as a fully developed flow profile, and it forms naturally in very long lengths of uninterrupted straight pipe. However, having long lengths of straight pipe is impractical and cost prohibitive. As a result, meter station piping often contains elbows, tees, valves and other assemblies that distort the flow profile into an asymmetric, unstable, and distorted configuration. This makes it very difficult to measure the fluid flow rate in a consistently accurate and repeatable manner. Under these conditions, flow conditioners are needed to correct the flow profile of the fluid such that it forms a fully developed flow profile which allows accurate, repeatable measurements to be made.

Several types of flow conditioners exist, including straightening vanes, tube bundles, and perforated plates. These flow conditioners are placed within the pipe upstream of the flow meter. A typical perforated plate flow conditioner consists of a perforated metal plate that is arranged within a pipe orthogonal to the fluid flow (i.e., across the entire cross section of pipe). The perforations or holes in the flow conditioner cause the fluid flow to be redistributed such that it forms a fully developed flow profile. The placement of a flow conditioner upstream of the flow meter ensures that the flow is fully developed before it reaches the meter. This allows the meter to perform significantly more accurate and repeatable fluid flow measurements.

Currently, in order to measure the pressure drop across a flow conditioner, a pipeline in which a flow conditioner is installed is tapped immediately upstream or downstream of the flow conditioner. A separate orifice fitting or orifice flange of the pipeline may be used to house the flow conditioner.

SUMMARY OF THE INVENTION

A flow conditioner according to a first embodiment of the present invention includes a plate having a hole pattern and a flange surrounding the plate; and at least one pressure tap that is integral with the flow conditioner. The at least one pressure tap is on at least one of a first face of the flow conditioner, a second face of the flow conditioner, within a hole, or any combination thereof.

A flow conditioner according to a second embodiment of the present invention and further to any of the previous embodiments comprises an integral pressure tap on a first face of the flow conditioner, an integral pressure tap on a second face of the flow conditioner, and an integral pressure tap within at least one hole.

A flow conditioner according to a third embodiment of the present invention and further to any of the previous embodiments comprises at least one integral pressure tap that extends through the flange to at least one hole.

A flow conditioner according to a fourth embodiment of the present invention and further to any of the previous embodiments comprises at least one integral pressure tap having an inner cylindrical section that joins an outer threaded connection.

A flow conditioner according to a fifth embodiment of the present invention and further to any of the previous embodiments comprises a gauge line connection removably connected to an outer threaded connection of the at least one integral pressure tap.

A flow conditioner according to a sixth embodiment of the present invention and further to any of the previous embodiments comprises a flow conditioner having a stepped configuration.

A method of measuring a pressure drop across a flow conditioner according to one embodiment to the present invention comprises measuring fluid pressure with at least one integral pressure tap of a flow conditioner according to any of the previous embodiments.

An advantage of the flow conditioner with integral pressure tap of the present invention is that it allows a pressure drop to be easily measured without expensive third party equipment (such as an orifice plate fittings or orifice flange unions) and without having to pressure tap a pipe wall itself.

Another advantage of the present invention is that it allows for a standardized pressure tap layout, which provides consistent readings that can be verified with baseline test data at a test lab using the same correction factor.

As used herein "substantially", "relatively", "generally", "about", and "approximately" are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

Given the following enabling description of the drawings, the methods and systems should become evident to a person of ordinary skill in the art.

BRIEF DESCRIPTION OF THE DRAWINGS

FIG. 1A illustrates a front view of a first side of a flow conditioner according to one embodiment of the present invention.

FIG. 1B illustrates a cross-sectional view of the flow conditioner of FIG. 1A via line A-A.

FIG. 1C illustrates a cross-sectional view of the flow conditioner of FIG. 1A via line B-B.

FIG. 1D illustrates a close-up view of Detail C of FIG. 1C.

FIG. 2A illustrates a front view of a first side of a flow conditioner according to another embodiment of the present invention.

FIG. 2B illustrates a cross sectional view of the flow conditioner of FIG. 2A.

FIG. 3 illustrates a cross-sectional view of a stepped flow conditioner with an integral pressure tap according to another embodiment of the present invention.

Figure 4:
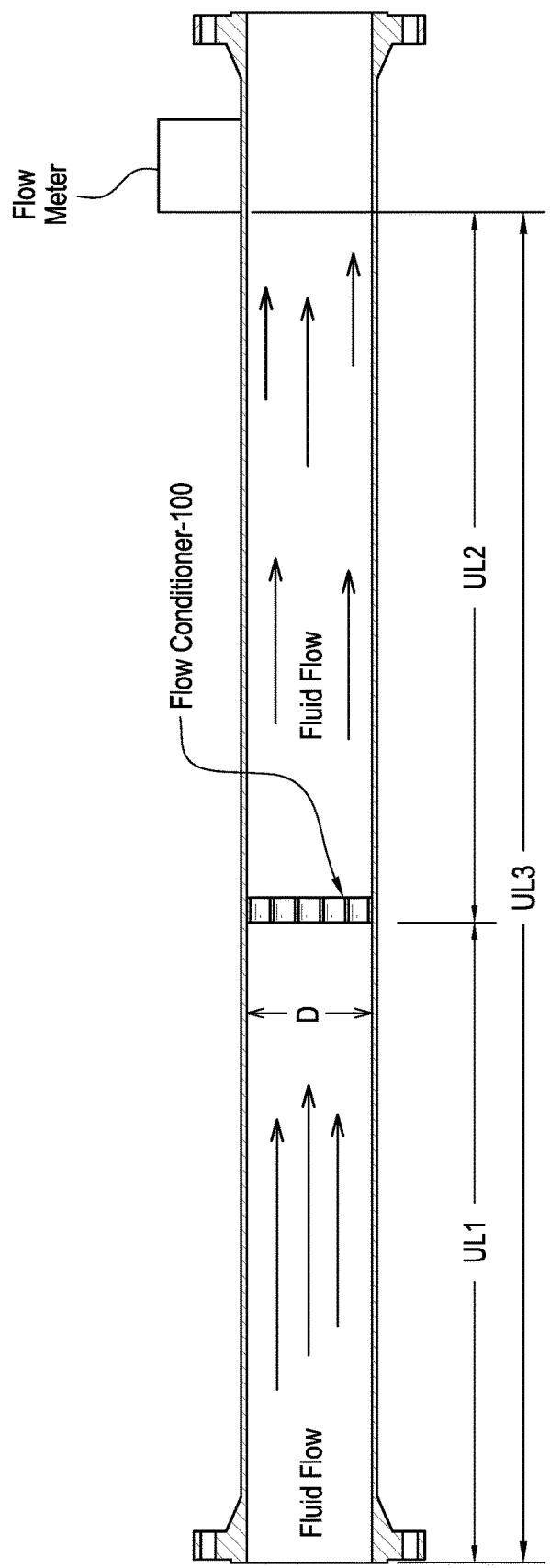
FIG. 4 is a schematic illustration of a flow conditioner in a pipeline upstream of a flow meter according to the present invention.

Given the following enabling description of the drawings, the methods and systems should become evident to a person of ordinary skill in the art.

DETAILED DESCRIPTION OF THE INVENTION

The flow conditioner according to the present invention may be utilized for flow metering and diagnosis of flow, for example, in oil, gas, and water pipelines. The flow conditioner comprises at least one pressure tap that is integral with the flow conditioner itself. Thus, the at least one pressure tap may be machined out of the same material as the flow conditioner and is physically part of the flow conditioner. The at least one pressure tap is not separately attached or connected to the flow conditioner, for example, via a weld or adhesive connection, and the flow conditioner does not comprise any tube bundle. The at least one pressure tap allows pressure drop measurements, which are used to observe the operational performance of the flow conditioner.

As shown in FIG. 1A, a flow conditioner 100 according to one embodiment of the present invention comprises a plate 105 having a hole pattern 110, for example, a radial hole pattern or array. The hole pattern may comprise a central hole at a center of the flow conditioner surrounded by at least one concentric ring (e.g. 2-5 concentric rings) of holes. The holes may be of any geometric shape, for example, a circular shape.

Suitable flow conditioners that may have at least one integral pressure tap include, but are not limited to, CPA TBR, CPA 50E, and 55E/65E flow conditioners available from Canada Pipeline Accessories, Inc. of Calgary, Canada. Suitable flow conditioners may have integral vanes or a stepped configuration, as disclosed in U.S. Pat. Nos. 9,334,886; 9,297,489; D697,581; D713,492; or D721,417, the entireties of which are incorporated herein by reference. See also WO 2014/04191 A1; WO 2014/110673 A1; and WO 2014/186883 A1.

According to the present invention, the flow conditioner comprises at least one integral pressure tap. In specific embodiments, there may be (1) an integral pressure tap on a first (e.g., upstream) face of the flow conditioner; (2) an integral pressure tap on a second (e.g., downstream) face of the flow conditioner; (3) an integral pressure tap within a hole (e.g., a hole 'throat'), or; (4) any combination of such integral pressure taps. A pressure tap within a hole throat means a point within a hole (e.g., a point within a fluid length defined by the hole). The at least one integral pressure tap may be used to measure a pressure drop before, during, and after a fluid measurement process.

In specific embodiments of the present invention, the at least one integral pressure tap 115 may extend through (e.g., be drilled through) a flow conditioner flange 120, as illustrated in FIGS. 1A-1D. The flow conditioner flange 120 surrounds and is integral with a flow conditioner plate 105 comprising hole pattern 110.

As shown in FIG. 1B, a pressure tap 115 may extend through flange 120 to a hole for a throat tap. As shown in FIG. 1C, there may be two integral pressure taps, each pressure tap 115 being on a corner of the flow conditioner plate immediately before or after a hole (e.g., on or near a first face of the flow conditioner and on or near a second face of the flow conditioner). In a specific embodiment, the at least one integral pressure tap 115 may comprise an inner cylindrical passage 125 that flares out or joins an outer threaded connection 130.

The at least one pressure tap allows fluid pressure to be measured at various points on the flow conditioner surface (e.g., upstream face, downstream face) and/or within one or more holes. The fluid pressure measurements or readings may be transferred from the flow conditioner using connections on the flow conditioner flange. The connections on the flange may be made to comply with National Pipe Thread (NPT) or other industry standard connections. In a specific embodiment, gauge line connections may be made on a flow conditioner flange, for example, a gauge line connection 135 may be removably connectable to a threaded connection 130 of the at least one pressure tap 115, as shown in FIG. 1C.

As shown in FIG. 2A, a integral pressure tap 115 according to another embodiment of the present invention may extend through flange 120 between holes. The cylindrical passage 125 of the integral pressure tap 115 may then may be configured (e.g., bent at an angle as shown in FIG. 2B) to tap a point on the flow conditioner surface.

As shown in FIG. 3, a flow conditioner may have a stepped configuration. At least one integral pressure tap extends through the flow conditioner flange to a hole. Alternatively, or in addition thereto, at least one integral pressure tap may be configured to measure fluid pressure on a first face of the flow conditioner and/or on a second face of the flow conditioner.

In use, as shown in FIG. 4, the flow conditioner 100 according to an embodiment of the present invention is placed upstream of a flow meter in a fluid flow pipe of a pipe assembly. The first section of the pipe assembly has a pipe length UL1 and the second section of the pipe assembly has a pipe length UL2. The combined length of the first section of the pipe assembly, UL1, and the second section of the pipe assembly, UL2, is represented as UL3.

The flow conditioner creates a fluid pressure drop that is measured using the at least one integral pressure tap. In a specific embodiment, pressures on at least one of an upstream face, a downstream face, or a hole throat may be collected and transmitted via the flow conditioner flange and connections to a flow computer. The pressures are then compared to calculate the flow across the flow conditioner.

The flow conditioner with integral pressure tap of the present invention allows a pressure drop to be easily measured without expensive third party equipment (such as an orifice plate fittings or orifice flange unions (OFU), for example, those available from DANIEL®) and without having to pressure tap a pipe wall itself. Thus, no additional modifications have to be made to the piping. A customer does not have to buy equipment and modify it for other uses (e.g., an orifice fitting containing a flow conditioner).

Currently, the location of pressure taps are not uniform with respect to a flow conditioner. Accordingly, pressure data must be measured and subjected to a correction factor. In contrast, the flow conditioner of the present invention allows for a standardized pressure tap layout (size and location of the pressure taps), which provide consistent readings that can be verified with baseline test data at a test lab using the same correction factor.

Although the present invention has been described in terms of particular exemplary and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary and alternative embodiments described above can be configured without departing from the scope and spirit of the invention. Therefore, it is to be understood that, within the scope of the appended claims, the invention may be practiced other than as specifically described herein.

The invention claimed is:

1. A flow conditioner, comprising:
a plate having a hole pattern and a flange surrounding the plate; and
at least one pressure tap that is integral with the flow conditioner,
wherein the at least one pressure tap is on at least one of a first face of the flow conditioner, a second face of the flow conditioner, within a hole, or any combination thereof.

2. A flow conditioner according to claim 1, comprising an integral pressure tap on a first face of the flow conditioner, an integral pressure tap on a second face of the flow conditioner, and an integral pressure tap within at least one hole.

3. A flow conditioner according to claim 1, wherein the at least one integral pressure tap extends through the flange to at least one hole.

4. A flow conditioner according to claim 1, comprising two integral pressure taps, each integral pressure tap being located on a corner of the flow conditioner plate immediately before or after a hole.

5. A flow conditioner according to claim 1, wherein the at least one integral pressure tap comprises an inner cylindrical section joining an outer threaded connection.

6. A flow conditioner according to claim 5, further comprising a gauge line connection removably connected to an outer threaded connection.

7. A flow conditioner according to claim 1, wherein the hole pattern comprises an inner ring of holes and at least one outer ring of holes.

8. A flow conditioner according to claim 1, wherein the flow conditioner has a stepped configuration.

9. A flow conditioner according to claim 1, wherein the at least one integral pressure tap extends between holes and is bent at an angle to tap a surface of the flow conditioner.

10. A flow conditioner according to claim 1, wherein the flow conditioner has no tube bundle.

11. A flow conditioner having an integral pressure tap, comprising:
a plate having a plurality of holes and a flange surrounding the plate; and
at least one pressure tap that is integral with the flow conditioner,
wherein the at least one pressure tap is configured on a surface selected from the group consisting of a first face of the flow conditioner, a second face of the flow conditioner, a hole throat, and any combination thereof.

12. A pipe assembly for flow measurement, comprising:
a fluid flow pipe;
a flow conditioner according to claim 1 disposed in said fluid flow pipe in an orientation substantially perpendicular to an axis of said fluid flow pipe.

13. A pipe assembly according to claim 12, wherein there the fluid flow pipe contains no orifice plate fitting or orifice flange union for the flow conditioner.

14. A method of measuring a pressure drop across a flow conditioner comprising measuring fluid pressure with the least one integral pressure tap of a flow conditioner according to claim 1.

15. A method according to claim 14, further comprising transferring the measurements via a gauge line connection on the flange and removably connected to the at least one integral pressure tap.

* * * * *